R. A. FESSENDEN.
SIGNALING BY SOUND AND OTHER LONGITUDINAL ELASTIC IMPULSES.
APPLICATION FILED JAN. 10, 1914.

1,108,895.

Patented Sept. 1, 1914.

2 SHEETS—SHEET 1.

WITNESSES:
M. E. Flaherty
P. E. O'Brien

INVENTOR:
Reginald A. Fessenden
By his attorneys,
Brown & Hayes

R. A. FESSENDEN.
SIGNALING BY SOUND AND OTHER LONGITUDINAL ELASTIC IMPULSES.
APPLICATION FILED JAN. 10, 1914.

1,108,895.

Patented Sept. 1, 1914.
2 SHEETS—SHEET 2.

WITNESSES:
M. E. Flaherty
R. E. O'Brien

INVENTOR:
Reginald A. Fessenden
By his attorneys.
Forrest & Hayes

UNITED STATES PATENT OFFICE.

REGINALD A. FESSENDEN, OF BROOKLINE, MASSACHUSETTS, ASSIGNOR TO SUBMARINE SIGNAL COMPANY, OF WATERVILLE, MAINE, A CORPORATION OF MAINE.

SIGNALING BY SOUND AND OTHER LONGITUDINAL ELASTIC IMPULSES.

1,108,895. Specification of Letters Patent. Patented Sept. 1, 1914.

Application filed January 10, 1914. Serial No. 811,428.

*To all whom it may concern:*

Be it known that I, REGINALD A. FESSENDEN, of Brookline, in the county of Norfolk and State of Massachusetts, a citizen of the United States, have invented a new and useful Improvement in Signaling by Sound and other Longitudinal Elastic Impulses, of which the following is a specification.

My invention relates to improved methods and apparatus for signaling by sound and other longitudinal elastic impulses, and has special reference to submarine signaling, whereby there will be increased efficiency, economy and adaptability in sound signaling, and still more especially to the transmission and receipt of signals over long distances, and directional sending and receiving in combination with long range of action; and also to the detection of submarine vessels and other bodies and the noises due to screw propellers and waves.

Figure 1:
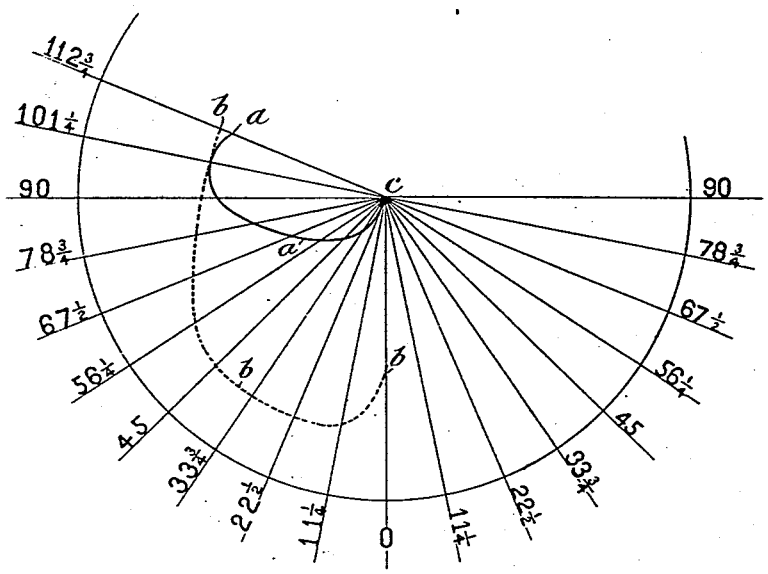
Figure 2:
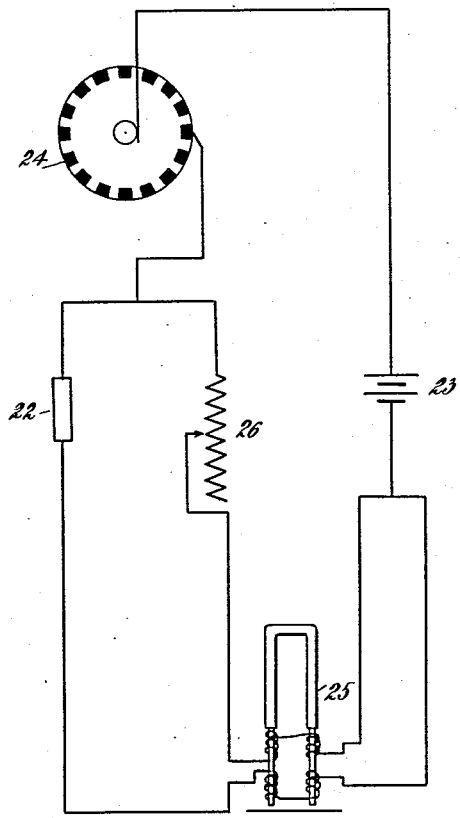
Figure 2:
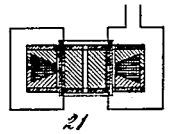

In the drawings:—Figure 1 shows diagrammatically the distribution of sound produced by vibrating the plating of a submarine boat for frequencies of 1,000 and 500 per second. Fig. 2 shows diagrammatically an arrangement of apparatus adapted to operate in connection with the invention herein described.

In the art of submarine signaling it has heretofore been customary to use notes having a frequency of from 1,000 to 2,500 per second. This has been for the following reasons: When sound is given out by a vibrating mass, the energy given out must first have been stored in the mass in the form of elastic energy. This may exist in two forms, *i. e.* as bending stress, for example in the case of a bell, or as compressional stress, for example in the case of a longitudinal rod or wire. Now the amount to which a rod can be bent depends upon the ultimate fiber stress of the surface farthest removed from the axis of bending. Consequently, since the stress of the outside surface can be no greater in the case of a thick bar than of a thin one, it follows that the mass efficiency of sound production falls off very rapidly with thick sections. Also, the efficiency of sound radiation from a vibrating section depends upon a power of the ratio of the length of the vibrating portion to the wave length, and if this be too small, little sound is emitted. It has been determined practically that the best proportions in the case of a bell are such as to give a note of about 1,000 to 1,200 per second, and this is what is used in practice. In the case of a longitudinally-vibrated bar or wire I have shown elsewhere that the mass efficiency does not fall off with increase of size, but here another difficulty comes in in that the length of the bar becomes too great, and as the velocity of sound in steel is about 16,000 feet, it follows that in order to get the pitch of the vibration down to as low as 1,000 per second the rod must be at least 8 feet long, and lengths longer than this have not been found practical, so that 2,000 per second has generally been used for longitudinally-produced vibrations. These high pitched notes, while useful for many purposes, cannot be used on board ship as I have found by experimental investigations, for transmitting messages from one ship to another, or for communicating them between ships in column formation. They have also other disadvantages which I will not go into. As the result of the experiments made by me I have found that the reason is that such waves, of frequencies of the order of 1,000 per second, cast sound shadows of sufficient sharpness to prevent the sounds transmitted from one side of the bow or the stern of a ship from reaching to a sufficient distance directly ahead or astern, or from being received when sent from positions directly ahead or astern. In the experiments referred to, I varied the wave length of the sound waves and found that when the wave length was lengthened, *i. e.* the frequency lowered, the strength of the signals received or sent directly ahead or astern increased markedly, so much so that for frequencies of 300 per second the range ahead and astern increased so as to be sufficient for most practical purposes, while at the same time a certain and sufficient amount of directional sending is retained.

In Fig. 1 I give results plotted from observations made in Newport Harbor, for frequencies of 1,000 per second shown in the full line *a* and for 500 per second shown in the dotted line *b*. It will be seen that with the lower frequency the percentage of sound thrown ahead is greatly increased. In this case the zero line indicates the direction of movement of the ship, the center *c* indicating the sending instrument on the starboard bow of a ship which is headed in a line approximating and parallel to the zero line.

My invention therefore primarily consists in the use (led up to by my experimental work) of frequencies low in comparison with 1,000 per second, say approximately 300 per second. I have also found experimentally that while 300 per second is sufficiently low for many purposes there are advantages in certain cases in using much lower frequencies, in some cases frequencies so low that they do not give a musical note. For these very low notes and for these frequencies below those which produce musical notes, I find it preferable to use a novel method of reception, which is uniquely adapted to work as a part of the system employing these low frequencies. This method is as follows:—In Fig. 2, 21 is the source of sound which may be located on shipboard or elsewhere. This may be an electric oscillator described in my United States application Serial No. 744,793, filed January 29, 1913, or a ship's propeller or waves striking against a shore or iceberg or sounds reflected from an iceberg. The receiving system is located upon another ship or on shore and comprises a microphone or magnetophone 22. 23 is a battery which may be cut out when a magnetophone is used. 24 is a revolving circuit breaker producing interruptions at a high frequency, say 1,000 per second. 25 is a telephone receiver with a differential winding, one winding being connected in series with the microphone as shown and the other in series with the variable resistance or resistance and inductance 26, the currents flowing in opposite directions in the windings. It will be seen that with the microphone unexcited and the commutator revolving a high pitched note will be heard in 25, which may be diminished to any desired extent by turning in or out more of the resistance 26, thus balancing the differential telephone. It is preferred to have a slight noise remain, as it is found that the ear is more sensitive under such circumstances to a slight change in the microphone resistance. Now, on a sound being emitted from the source 21, which may have any frequency but preferably one lower than 300, for example a sound produced by a propeller of a ship and having a frequency of 7 per second, nothing will be heard in the telephone so long as the commutator is not revolving, a frequency of 7 being audible with great difficulty or not at all unless carrying a large amount of energy. But if the commutator is revolving the slight sound of a frequency of 1,000 will be heard to rise and fall seven times per second, and will be extremely distinct and easily heard. When a magnetophone is used the differential winding and resistance 26 may be omitted. By this means the presence of ships can be detected and signaling can be accomplished by the use of low frequency notes, which could not be done before. Not only can this method be used for submarine signaling or detecting submarine sounds, but it can also be used for signaling in the air, in the ether, or in electric circuits such as telegraph or cable circuits.

What I claim as my invention is:—

1. The method of signaling which consists in transmitting low frequency impulses from a sending station, thereby producing at the receiving station low frequency electric impulses in an electric circuit operatively connected to an indicating instrument, breaking up said low frequency electric impulses into high frequency impulses, and passing said high frequency impulses through said indicating instrument.

2. The method of submarine signaling which consists in transmitting low frequency impulses through the water from a sending station, thereby producing at the receiving station low frequency electric impulses in an electric circuit operatively connected to an indicating instrument, breaking up said low frequency impulses into high frequency impulses, and passing said high frequency impulses through said indicating instrument.

3. The method of signaling which consists in transmitting impulses of a frequency of less than 500 per second from a sending station, thereby producing at the receiving station low frequency electric impulses in an electric circuit operatively connected to an indicating instrument, breaking up said low frequency electric impulses into high frequency impulses, and passing said high frequency impulses through said indicating instrument.

4. The method of submarine signaling which consists in transmitting impulses of a frequency of less than 500 per second through the water from a sending station, thereby producing at the receiving station low frequency electric impulses in an electric circuit operatively connected to a receiving instrument, breaking up said low frequency electric impulses into high frequency impulses, and passing said high frequency impulses through said indicating instrument.

REGINALD A. FESSENDEN.

Witnesses:
ROBERT FULTON BLAKE,
ROBERT L. WILLIAMS.